No. 654,596. Patented July 31, 1900.
F. & T. J. BEZEMER.
ROTARY ENGINE.
(Application filed May 19, 1899.)
(No Model.)
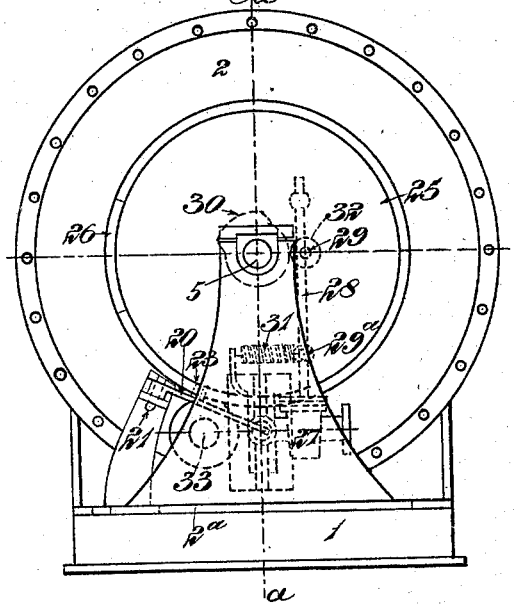
Fig. 1.
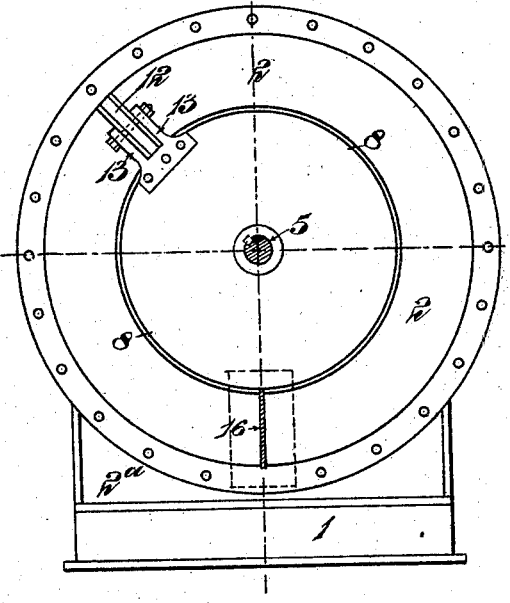
Fig. 3.
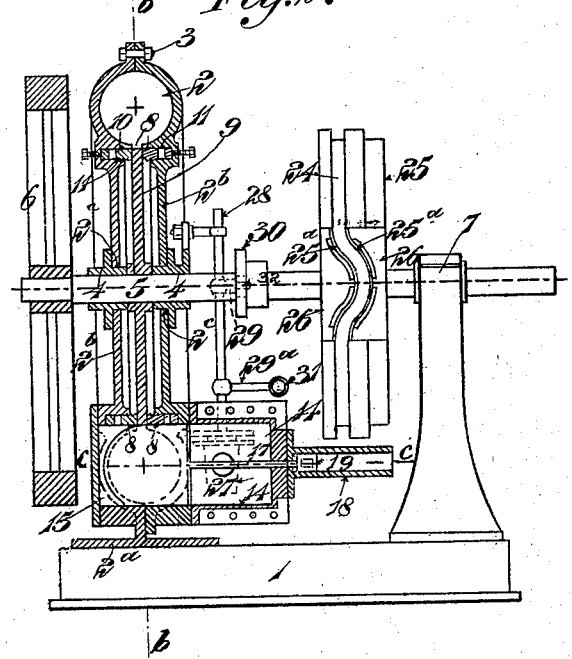
Fig. 2.
Fig. 4.
Witnesses
M. W. Haskell
Inur Seavey
Inventors
F. Bezemer
T. J. Bezemer
by O. E. Duff, Atty.

UNITED STATES PATENT OFFICE.

FELIX BEZEMER, OF VELP, AND TAMMO JACOB BEZEMER, OF WAGENINGEN, NETHERLANDS, ASSIGNORS TO THEMSELVES AND LEONARDUS ARNOLDUS VAN SCHIE, OF ROTTERDAM, NETHERLANDS.

ROTARY ENGINE.

SPECIFICATION forming part of Letters Patent No. 654,596, dated July 31, 1900.

Application filed May 19, 1899. Serial No. 717,412. (No model.)

*To all whom it may concern:*

Be it known that we, FELIX BEZEMER, residing at Velp, near Arnhem, and TAMMO JACOB BEZEMER, residing at Wageningen, Netherlands, subjects of the Queen of Netherlands, have invented Improvements in Rotary Engines, of which the following is a specification.

This invention has reference to an improved construction of rotary engine of the type in which the motive-fluid chamber which takes the place of the cylinder in an ordinary reciprocating engine is annular, is internally of circular form, as seen in cross-section, and is fitted with a piston that travels in a circular course.

Referring to the accompanying drawings, Figure 1 is an end elevation of a rotary engine according to this invention. Fig. 2 is a vertical section on the line $a\,a$, Fig. 1; Fig. 3, a vertical section on the line $b\,b$, Fig. 2; and Fig. 4, a horizontal section on the line $c\,c$, Fig. 2.

1 is the bed-plate of the engine, on which is mounted an annular chamber 2, formed in halves, one of which is formed with a foot or base $2^a$, by which it is secured to the bed-plate. The two halves are fastened together by bolts 3 and are formed with inwardly-extending webs $2^b$, formed with central apertures $2^c$, fitted with bearings 4, through which the main shaft 5 of the engine extends. The said shaft is provided at one end with a flywheel 6, and its other end portion is supported in a bearing 7. There is an annular opening 8 at the inner circumference of the annular chamber 2, and the peripheral portion of a disk or wheel 9, fixed upon the engine-shaft, extends into this annular opening, a fluid-tight joint being made by packing-rings 10, which in one arrangement are screw-threaded and are screwed into annular recesses or grooves 11 in the opposite surfaces of the two halves of the chamber.

12 is a piston fitting the chamber 2 and carried by the disk or wheel 9, to which it may be connected by means of a bracket or pair of arms 13.

14 is a valve chest or casing which is in communication with a chamber or enlarged part 15 of the chamber 2 and is adapted to receive a valve or door 16, which in one extreme position forms a partition across the annular chamber 2 and in the other extreme position affords free passage for the piston 12. The valve or door 16 has connected to it a rod 17, which passes fluid-tight through the wall of the valve chest or casing into a slotted guide-tube or equivalent device 18, where it is secured to a block or head 19, which can slide in and is guided by the guide-tube 18. With the sliding block or head there engages a lever 20, adapted to oscillate or move radially about a pivot 21 and which is provided with a pin 22, furnished with an antifriction-roller 23, located in a cam-groove 24, formed in the periphery of a disk or wheel 25, keyed upon the engine-shaft. One part of the groove 24 is so curved as to operate the lever 20 to impart longitudinal movement to the connecting-rod 17 first in one direction and then in the reverse direction, thus at the proper time moving the valve or door 16 from its position across the annular chamber into the chest or casing 14, so as to allow the piston to pass and then back again, so as to serve as an abutment against which the steam acts. On the opposite sides of the curved portion of the cam-groove there are blocks or parts formed with recesses having spring blades or plates $25^a$ of a form corresponding to the contour of this part of the groove, which are supported at intervals by recessed blocks 26, to which they are secured by means of screws or bolts. By means of these spring blades or plates the antifriction-roller 23 is allowed to pass rapidly through the curved part of the cam-groove without shock, the springs yielding sufficiently for this purpose.

Motive fluid, such as steam, is admitted to the annular chamber 2 through a suitable cock or valve 27, which is shown connected to the valve-chest 14, through which the steam passes. The plug of the cock is mounted on a spindle 28, provided with arms 29 $29^a$, through which it is actuated in a rotary sense in one direction by means of a cam 30, mounted on the engine-shaft and acting against the arm 29, and in the opposite direction by means of a spring 31, connected to the arm 29ª.

32 is an antifriction-wheel which may be interposed between the cam 30 and the arm 29. The cam 30 is so set upon the shaft in relation to the curved portion of the cam-groove 24 and the piston 12 that when the sliding valve or door has been moved into position across the annular chamber the cock is opened to allow actuating fluid to enter, by way of the valve-chest 14, the annular chamber 2 between the valve or door 16 and the piston 12, so as to drive the piston forward. In the case of steam or other expansive fluid the cam 30 will be shaped so as to cut off the supply at the required time to allow the fluid to expand as may be desired. Motive fluid that has done duty in the annular chamber escapes by an exhaust-opening 33, formed with the wall of the chamber in proximity to the valve or door 16.

As will be seen from Fig. 3, the exhaust side of the valve or door 16 fits close up against the wall of the chamber, while on the other side there is a space for the passage of fluid from the valve-chest; but the cock may, if desired, be connected direct to the annular chamber.

The details of construction may be more or less varied by providing inlets for the admission of motive fluid to the annular chamber upon either side of the valve or door 16 at will, suitable exhaust or outlet openings and means for closing the said inlets and outlets being provided, so as to enable engines according to this invention to be reversed, as may in some cases be desirable—for example, in engines for marine purposes. Also, by means of an additional annular chamber or chambers, engines according to this invention may be compounded. Such engines may be adapted for triple expansion or otherwise.

What we claim is—

1. A rotary engine comprising an annular motive-fluid chamber formed at its inner circumference with an annular opening, a piston fitting said chamber, a disk or wheel fixed to the engine-shaft and the peripheral portion of which extends through the annular opening and is connected to the piston, annular screw-threaded grooves in the opposite walls of said annular opening, screw-threaded packing-rings screwed into said grooves and bearing against the surface of said disk or wheel, a movable valve or door capable of being placed transversely across said motive-fluid chamber, and means for controlling the admission of motive fluid as set forth.

2. A rotary engine comprising an annular motive-fluid chamber formed with an annular opening and having in communication therewith a valve-chest, a movable valve or door which in one position forms a partition across the annular chamber, a lever coupled to said valve or door, and having a pin or projection, and a rotary disk or wheel having a peripheral cam-groove that engages with said pin or projection, a disk or wheel having its peripheral portion extending through said annular opening and connected to a piston fitting said chamber, annular screw-threaded grooves in the opposite walls of said annular opening, screw-threaded packing-rings screwed into said grooves and bearing against the surface of said disk or wheel, and means for controlling the admission of motive fluid as set forth.

3. In an engine of the type referred to, the combination of a movable valve or door which in one position serves as a partition across said annular chamber, a lever coupled to said valve or door and having a pin or projection, and a rotary disk or wheel formed with a peripheral cam-groove that engages with said pin or projection, the laterally-curved portion of said cam-groove having its sides formed of spring blades or plates as and for the purpose specified.

4. In an engine of the type referred to, the combination of a movable valve or door which in one position serves as a partition across said annular chamber, a lever coupled to said valve or door and having a pin or projection, and a rotary disk or wheel formed with a peripheral cam-groove that engages with said pin or projection, the laterally-curved portion of said cam-groove having its sides formed of spring blades or plates supported at intervals only as and for the purpose specified.

5. In a rotary engine of the type referred to, an annular motive-fluid chamber formed in two parts each formed with inwardly-extending webs having central apertures fitted with the bearings of the main engine-shaft, an annular opening at the inner periphery of said motive-fluid chamber, annular screw-threaded grooves in the opposite walls of said annular opening, and screw-threaded packing-rings screwed into said grooves as set forth.

6. In a rotary engine of the type referred to, the combination of an annular motive-fluid chamber formed in two parts each formed with inwardly-extending webs having central apertures fitted with the bearings of the main engine-shaft, a disk or wheel keyed to the engine-shaft between said bearings and having its peripheral portion extending through an annular opening at the inner periphery of said motive-fluid chamber, annular screw-threaded grooves in the opposite walls of said annular opening, and screw-threaded packing-rings screwed into said grooves as set forth.

7. In a rotary engine of the type referred to, the combination of an annular motive-fluid chamber formed in two parts, each formed with inwardly-extending webs having central apertures fitted with the bearings of the main engine-shaft, a disk or wheel keyed to the engine-shaft between said bearings and having its peripheral portion extending through an annular opening at the inner circumference of the annular chamber, annular screw-threaded grooves in the opposite walls of said annular opening, screw-threaded packing-rings screwed into said grooves and bearing against the surface of said disk or wheel, and a motive-fluid admission-cock, the plug of which is closed by a spring acting on an arm connected to its spindle, but which plug is turned to admit motive fluid to the engine at the required times by means of a cam carried by the engine-shaft as set forth.

8. A rotary engine comprising an annular chamber 2 with annular opening 8, a piston 12 fitting said chamber and connected to a disk or wheel 9 fixed to the engine-shaft 5, a valve or door 16 having its spindle 17 fitted with a sliding head 19, a lever 20 with pin 22, a disk or wheel fixed to the engine-shaft and having a cam-groove 24 in which is located said pin 22, and means for controlling the admission of motive fluid, as set forth.

9. A rotary engine comprising an annular chamber 2 with annular opening 8, a piston 12 fitting said chamber and connected to a disk or wheel 9 fixed to the engine-shaft 5, a valve or door 16 having its spindle 17 fitted with a sliding head 19, a lever 20 with pin 22, a disk or wheel fixed to the engine-shaft and having a cam-groove 24 in which is located said pin 22, a cock 27 the spindle of whose plug 28 is provided with arms 29, 29$^a$, a cam 30 fixed to the engine-shaft, and a spring 31, as set forth.

Signed at Arnhem, Netherlands, this 4th day of May, 1899.

FELIX BEZEMER.
TAMMO JACOB BEZEMER.

Witnesses:
TH. A VAN DALSUM,
J. SPŸHER.